M. HOCKMAN.
Fertilizer Distributors.

No. 149,860.  Patented April 21, 1874.

Witnesses.
James Martin Jr.
G. N. Campbell.

Inventor.
Michael Hockman
by his attys
Mason Fenwick Lawrence

AM. PHOTO-LITHOGRAPHIC CO. N.Y. (OSBORNE'S PROCESS.)

UNITED STATES PATENT OFFICE.

MICHAEL HOCKMAN, OF MAURERTOWN, VIRGINIA.

IMPROVEMENT IN FERTILIZER-DISTRIBUTERS.

Specification forming part of Letters Patent No. 149,860, dated April 21, 1874; application filed September 17, 1873.

*To all whom it may concern:*

Be it known that I, MICHAEL HOCKMAN, of Maurertown, in the county of Shenandoah and State of Virginia, have invented a new and useful Improvement in Fertilizer-Distributers; and I do hereby declare that the following is a full, clear, and exact description thereof, reference being had to the accompanying drawings making part of this specification, in which—

Figure 1:
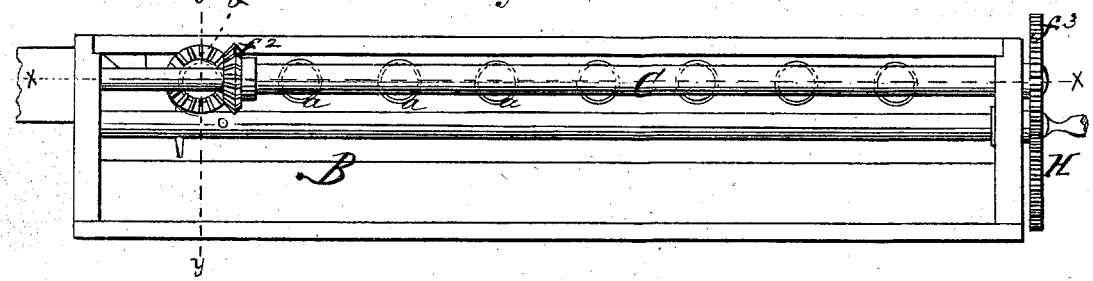
Figure 2:
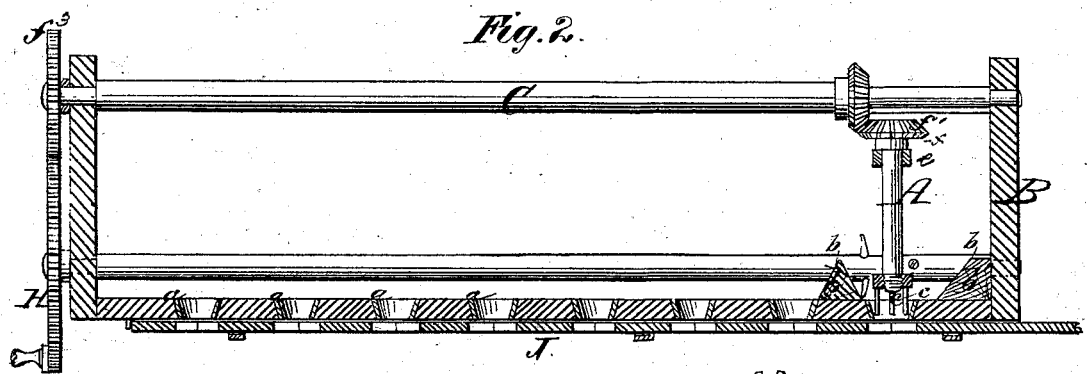
Figure 3:
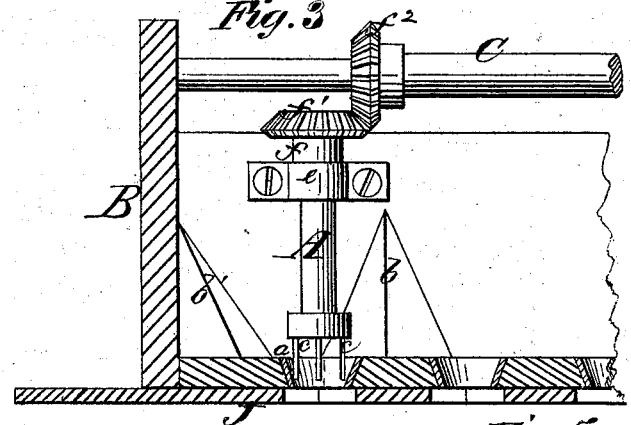
Figure 4:
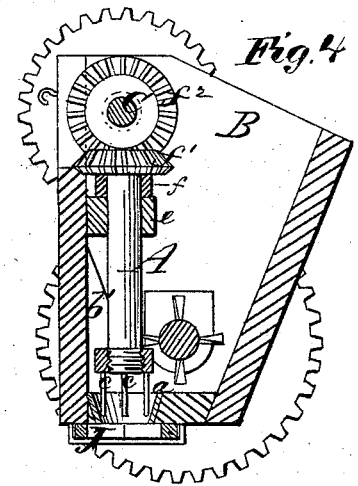
Figure 5:
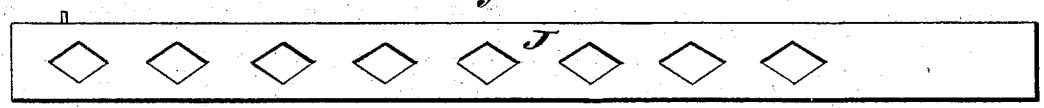

Figure 1 is a top view of a hopper with my improvements applied to it. Fig. 2 is a longitudinal section in the line $x\,x$ of Fig. 1. Fig. 3 is a similar section to Fig. 2 of a portion of the hopper and my improvements on a larger scale. Fig. 4 is a transverse section in the line $y\,y$ of Fig. 1. Fig. 5 is a top view of the gaging-slide, and Fig. 6 a transverse section of the stirring and feeding shaft on a larger scale.

The nature of my invention consists in the combination, with the discharge-apertures of the hopper and of the gage-slide, of vertical revolving pins, a series of stirring and feeding wings, and partial partitions of semi-pyramidical form, whereby fertilizing material can be continuously distributed in a very perfect manner.

Figure 6:
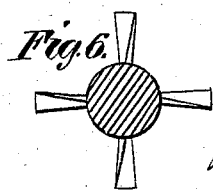

In the drawing I have represented only one of a series of vertical shafts, A, which are, in practice, to be arranged in the hopper B in the same relation to the respective discharging-holes in the bottom thereof, and to be geared to the shaft C in the same manner, that the one shown is arranged and geared. The hopper is made, as usual, with an upright back board, and its bottom near this back board is constructed with a series of discharge-holes, $a$, bushed with metal thimbles of a slightly-flaring form, as shown. Against the back board, and near the upper margin of the holes $a$, projecting strips or partial partitions $b\,b$, of a semi-pyramidical form, are constructed, as shown. One of these partitions occupies a position between each pair of holes, and the beginning of its base, on both sides, is about in line with the center of the holes. These partitions present a gradually-increasing projection from the back board until they terminate upon the bottom of the hopper, where they each form an angle, and have an extension equal to about half the diameter of the holes. Their form is such that one inclined side thereof directs the fertilizer to the right, and the other to the left. Their office is to prevent lodgment of fertilizer upon the bottom between the holes. Similar projections are formed at the rear inner corners of the hopper, as shown at $b'$, for a like purpose. The vertical shafts A have hubs attached to their lower ends, and in the bottom of these hubs prongs or pins $c\,c$ are formed. These prongs extend down into the conical discharge-holes, as shown. Their office is to separate and facilitate the discharge of fertilizer as it is fed into the holes. Each vertical shaft is suspended upon a bearing-box, $e$, by means of an enlarged shoulder, $f$, and at its upper end a bevel-wheel, $f^1$, is applied. This wheel, like all the others which are on the respective vertical shafts, gears with a bevel-wheel, $f^2$, on the shaft C, which extends from end to end of the hopper, and has a spur-pinion, $f^3$, on one of its ends, which gears with a spur-wheel, H, of a stirring and feeding shaft, I. The stirring and feeding shaft just named extends also from end to end of the hopper in a line forward of the discharging-holes, and is provided with wings or vanes $g$, which are flaring and beveled or feathered, they partaking somewhat of the character of a screw propeller-blade, as shown in Fig. 6 of the drawing. Two of these wings are radially set in the shaft to the right of the hole and two to the left thereof. One pair of the wings stand at right angles to the other pair. The office of these wings is to stir up and crowd the fertilizer toward and into the discharge-holes. Beneath the discharge-holes a gaging-slide, J, is fitted in guides, so as to be readily adjusted back and forth. In this slide, directly in range with the discharge-holes, lozenge or diamond shaped passages are formed. By moving this slide more or less to the right or left, according as it may be arranged for adjustment, variant quantities of fertilizer may be discharged—that is, the full capacity of the holes $a\,a$ may be discharged, and an infinitesimal quantity when desired, or the discharge-holes may be closed entirely.

In using this distributer, it is arranged upon a seed-drill so that its spur-wheel H shall gear with the drive-wheel thereof, and thus be kept in operation continuously while the drill is in motion.

What I claim as my invention, and desire to secure by Letters Patent, is—

The combination, with the discharge-holes of the hopper and gage-slide, of the semi-pyramidical projections or partial partitions $b\ b$ the pins or prongs $c\ c$ of the vertical shafts A, and the stirring and feeding wings of the shaft I, all constructed and arranged and operating substantially in the manner described.

MICHAEL HOCKMAN.

Witnesses:
J. W. DANNER,
H. SHULL.